United States Patent Office 3,133,948
Patented May 19, 1964

3,133,948
PRODUCTION OF ESTERS OF VINYLSULFONIC ACID AND AROMATIC HYDROXY COMPOUNDS
Harry Distler, Ludwigshafen (Rhine), Germany, assignor to Badische Anilin- & Soda-Fabrik Aktiengesellschaft, Ludwigshafen (Rhine), Germany
No Drawing. Filed June 6, 1961, Ser. No. 115,076
Claims priority, application Germany June 18, 1960
6 Claims. (Cl. 260—456)

This invention relates to a process for the production of esters of vinylsulfonic acid.

It is known that vinylsulfonic acid phenyl ester can be obtained by reacting vinyl sulfochloride with an alkali phenolate in an organic solvent. The yields obtainable by this prior art process are unsatisfactory. Another disadvantage of the said process is that the phenol must be converted into an alkali phenolate before the reaction. It is a well-known fact that anhydrous alkali phenolates are difficult to prepare on an industrial scale. Furthermore, the vinylsulfochloride, too, must be prepared separately from the readily accessible β-chloroethane sulfochloride.

It is an object of the invention to provide a process for the production of esters of vinylsulfonic acid and aromatic hydroxy compounds which gives improved yields. It is another object of the invention to provide a process for the production of esters of vinylsulfonic acid and aromatic hydroxy compounds in which the aromatic hydroxy compound need not be converted into an alkali salt in a preceding step. Still another object is to provide a process which directly starts from the readily accessible carbylsulfate.

Further objects of the invention will become apparent from the following detailed description of my invention.

In accordance with the invention, I have now found that these objects and advantages are achieved by reacting carbylsulfate with an aromatic hydroxy compound in an aqueous alkaline medium at a pH between 7.5 and 11.5, preferably between 8 and 10.

The reaction of carbylsulfate with phenol can, for example, be illustrated by the following scheme:

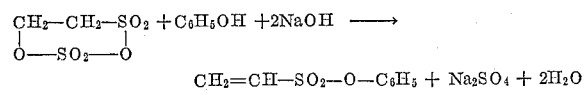

$$CH_2=CH-SO_2-O-C_6H_5 + Na_2SO_4 + 2H_2O$$

Carbylsulfate is readily accessible by reaction of ethylene with sulfur trioxide or oleum.

Aromatic hydroxy compounds which can be reacted in accordance with the invention are hydrocarbon compounds containing at least one carbocyclic aromatic ring and at least one hydroxy group directly attached to a carbocyclic aromatic ring. These compounds may further contain atoms or groups which are inert under the conditions of the reaction.

The preferred aromatic hydroxy compounds are those containing 1 to 3 carbocyclic aromatic rings and 1 to 3 hydroxy groups. If the aromatic hydroxy compound contains more than one aromatic ring, the rings may be condensed (as in naphthalene), linked by a single bond (as in diphenyl) or linked via a short-chain bridge (as in diphenylmethane). In the latter case, the bridge may be an alkylene group with 1 to 6 carbon atoms, oxygen, sulfur, —SO—, —SO$_2$—, alkylimino containing 1 to 4 carbon atoms or acylimino containing an acyl radical of a lower aliphatic carboxylic acid with 1 to 4 carbon atoms. The following atoms or groups which are inert under the reaction conditions are examples of substituents that may be attached to the said aromatic hydroxy compounds: chlorine, bromine, iodine, alkyl with 1 to about 20 carbon atoms, cycloalkyl with 6 to 12 carbon atoms, dialkylimino groups with 2 to 8 carbon atoms, acylimino groups containing a lower aliphatic carboxylic acid radical with 1 to 4 carbon atoms or an aromatic carboxylic acid radical with 7 or 8 carbon atoms, alkoxy groups containing 1 to 12 carbon atoms and the carboxylic, sulfonic acid, nitro and cyano groups.

The most satisfactory results are obtained by using aromatic hydroxy compounds containing 1 or 2 carbocyclic aromatic rings which are condensed or linked by a single bond or by way of an alkylene group having 1 to 4 carbon atoms, by oxygen, sulfur or —SO$_2$—. These compounds contain 1 or 2 hydroxy groups directly attached to a carbocyclic aromatic ring and may be substituted by chlorine, bromine and/or alkyl with 1 to 12 carbon atoms.

Suitable aromatic hydroxy compounds include: phenol, the cresols, the xylenols, p-tertiary butylphenol, nonylphenols, dodecylphenols, p-chlorophenol, 2,4-dibromophenol, 2,4,5- and 2,4,6-trichlorophenol, 2,3,4,5,6-pentachlorophenol, 2,4,6-tribromophenol, 4-chloro-2-methylphenol, α- and β-naphthol, 4,4'-dihydroxydiphenyl, 3,3'-dihydroxy diphenyl oxide, 4,4'-dihydroxy diphenyl sulfide, 4,4'-dihydroxy diphenyl methane, 2,2-bis-(4'-hydroxyphenyl)-propane, bis-(4'-hydroxyphenyl)-sulfone, resorcinol, hydroquinone, 4-nitrophenol, 3-cyanophenol, 4,4'-dihydroxydiphenyl, sulfoxide, N-methyl-3,3'-dihydroxydiphenyl amine, N-acetyl-di-(p-hydroxyphenyl)-amine, 3-iodophenol, octadecylphenols, 4-cyclohexylphenol, 4-cyclododecylphenol, 4-dibutylamino-phenol, 4-N-methyl-N-ethyl-amino-phenol, 4-acetylamino-2-methyl-phenol, 3-benzoyl-amino-phenol, 4-p-toluylamino-phenol, 3-methoxyphenol, 4-butoxyphenol, salicylic acid, 4-hydroxybenzene sulfonic acid, salicyclic aldehyde and the phenyl ester of salicylic acid.

The carbylsulfate and the aromatic hydroxy compound are usually reacted in equivalent quantities, i.e., a molar ratio of 1:1 is applied when monohydric phenols are used and a 1:2 phenyl/carbylsulfate ratio when dihydric phenols are used. Sometimes an excess (for example 5 to 20% or over) of one or the other component may be useful.

It is a characteristic feature of the novel process that the reaction is carried out in the presence of a substantial amount of water. The minimum amount of water depends inter alia on the particular phenol reacted; it may be as small as about 15% by weight with reference to the total reaction mixture. The amount of water employed usually varies between 30 and 80% by weight, preferably between 40 and 60% by weight. The upper limit is not critical. The reaction mixture is, however, less convenient to work up if the amount of water appreciably exceeds 90% by weight.

The novel process is carried out in an alkaline medium, preferably at a pH between 7.5 and 11.5. The most favorable pH range is 8 to 10. The desired alkalinity may be maintained by any method. The most convenient method consists in adding a base at such a rate that the split-off sulfuric acid is neutralized and the desired hydroxyl ion concentration set up. Any base which does not react with ether of the components present in the reaction medium can be used. The preferred bases are the oxides, hydroxides and carbonates of metals of groups IA and IIA of the periodic chart of the elements as well as tertiary amines, such as trimethylamine, tributylamine, dimethylaniline, diethylaniline, pyridine and quinoline. The bases most useful in the practice of my invention are alkali hydroxides in the form of about 5 to 50% by weight aqueous solutions. The base should be employed in an amount at least sufficient to bind the split-off sulfuric acid in the form of a salt. It is, however, also possible to use 5 to 10% less than the amount theoretically necessary, but in this case lower yields are obtained.

The pH value is controlled in conventional manner. A glass electrode connected to a calomel electrode may be used inter alia.

The reaction is usually carried out at a temperature between $-10°$ and $+100°$ C. The preferred temperature range is between 0° and 30° C.

It is recommended to coemploy in the reaction an organic solvent which is inert under the conditions of the reaction. Suitable solvents include aliphatic, cycloaliphatic or aromatic hydrocarbons, ethers, ketones, halogenated hydrocarbons and aliphatic or cycloaliphatic alcohols. Examples are petroleum ether, kerosene, cyclohexane, cyclooctane, benzene, toluene, xylene, diethyl ether, dibutyl ether, tetrahydrofurane, dioxane, acetone, methyl ethyl ketone, chloroform, carbon tetrachloride, ethylene chloride and trichloroethylene or alcohols with 4 or more, for example 8, carbon atoms, such as butanol, cyclohexanol or methyl cyclohexanol. The inert solvent is preferably added in an amount of about 20 to 80% by weight with reference to the total reaction mixture.

A convenient method of carrying out the reaction in accordance with the invention comprises dissolving or suspending the aromatic hydroxy compound in water or in a mixture of water and any of the inert solvents specified. To this solution or suspension, the carbylsulfate and the base are then added at the desired temperature simultaneously but separately, the rate of addition being governed by the pH of the mixture. It is advantageous to provide for good mixing during the addition of the said compounds, for example by means of an efficient stirrer. It is recommended to continue stirring the reaction mixture for some time after the carbylsulfate and the base have been added, in order to complete the reaction. The reaction mixture may subsequently be acidified. The water-insoluble reaction product is separated in conventional manner. Some of the vinylsulfonic acid esters are solid and can be purified by recrystallization, for example from methanol, preferably after a preceding distillation at reduced pressure. Others are sufficiently pure after distillation or even after the evaporation of the solvent.

The vinylsulfonic acid esters of aromatic hydroxy compounds are excellent co-monomers. They can be copolymerized, for example with unsaturated compounds, such as vinyl and vinylidene compounds other than the said vinylsulfonic acid esters. The vinylsulfonic acid esters of phenols can also be used as plasticizers, especially after reaction with long-chain alkanols.

The process in accordance with the invention is further illustrated by the following examples. The parts specified in the examples are parts by weight.

*Example 1*

71 parts of phenol is dissolved and suspended, respectively, in 500 parts of water and 200 parts of ethylene chloride. To this mixture there are added simultaneously from separate containers, within two hours, 94 parts of carbylsulfate and 179 parts of 25% aqueous sodium hydroxide solution, the pH of the mixture being maintained at 9.5. During the addition, the temperature is maintained at about 25° C. by external cooling. The reaction mixture is stirred for one more hour at the same temperature. Dilute sulfuric acid is then added until the reaction is acidic to congo red. The organic layer is separated and dried with sodium sulfate. The ethylene chloride is evaporated under diminished pressure and the residue distilled in vacuo. The first fraction is excess phenol having a boiling point up to 70° C. at 0.2 mm. Hg absolute. 62 parts of vinylsulfonic acid phenyl ester is obtained having a boiling point of 98° to 100° C. at 0.5 mm. Hg absolute. The product has the refractive index $n_D^{40}=1.5171$ and solidifies to form rhombic colorless crystals.

*Example 2*

In a reaction vessel, 95 parts of resorcinol is dissolved in 250 parts of water and 150 parts of ethylene chloride.

At a temperature between 0° and 5° C. and a pH of 9.0 to 10.0, 208 parts of technical-grade carbyl-sulfate and about 385 parts of aqueous 25% sodium hydroxide solution are simultaneously added while stirring. When the reaction is complete after two hours, the pH is adjusted to 10 and the reaction mixture stirred for 15 more minutes. The organic phase is separated and washed twice with water. The ethylene chloride is distilled in vacuo. The organic phase is subsequently freed from traces of water in a falling-film evaporator at 100° C. and 20 mm. Hg absolute. 81 parts of resorcinol bis-vinylsulfonate is obtained. This is a yield of 56% with reference to the resorcinol feed. The product solidifies after some time (M.P. 54° to 56° C.).

*Example 3*

110 parts of technical-grade 2,4-dichlorophenol is dissolved and emulsified in 500 parts of water and 200 parts of ethylene chloride. As described in Example 2, 104 parts of technical-grade carbylsulfate and 232 parts of aqueous 25% sodium hydroxide solution are added within two hours. The mixture is stirred for another hour and is then mixed with dilute hydrochloric acid until the reaction mixture is acidic to Congo red. The lower organic layer is separated and extracted with 1% aqueous sodium hydroxide solution in order to remove unreacted 2,4-dichlorophenol.

The organic layer is dried with sodium sulfate. The ethylene chloride is evaporated under diminshed pressure. The residue is distilled at a pressure of 0.4 to 0.5 mm. Hg absolute at a temperature of 148 to 156° C. 73 parts of 2,4-dichlorophenyl-vinylsulfonic acid ester is obtained. This is a yield of 58% of the theory. The refractive index of the colorless liquid is $n_D^{20}=1.5542$.

*Example 4*

110 parts of nonylphenol is emulsified in 100 parts of ethylenechloride, 100 parts of acetone and 500 parts of water. To this emulsion, 104 parts of carbylsulfate and 258 parts of aqueous 25% sodiumhydroxide solution are added while stirring and cooling. The temperature during the addition is 0° to 5° C. and the pH is maintained at 9.0 to 9.5. The reaction mixture is stirred for another hour. The organic layer is separated and washed twice with water. The organic phase is dried and freed from solvent in vacuo. There is obtained as a residue 85 parts (yield 55% of the theory) of vinylsulfonic acid nonylphenyl ester in the form of a colorless viscous oil having the refractive index $n_D^{20}=1.5115$.

*Example 5*

142.5 parts of technical-grade 4-chloro-o-cresol, 500 parts of water and 200 parts of ethylene chloride are intensely mixed. At a temperature between 0 and 5° C., 282 parts of technical-grade carbyl-sulfate (about 80% carbyl-sulfate) is added to the mixture in portions within 2 hours while stirring continuously and, separately, 678 parts of 25% by weight aqueous sodium hydroxide solution in such a way that a pH of 9 to 9.5 is maintained.

Stirring is continued for half an hour and the mixture then acidified to pH 5 by adding hydrochloric acid. The organic layer is separated, washed with water and dried with sodium sulfate. By distillation under reduced pressure, 142 parts (61% of the theory) of vinylsulfonic ester of 4-chloro-o-cresol, M.P. 52 to 53° C., is obtained in the range of 153 to 159° C./1.0 mm. Hg.

*Example 6*

108 parts of a cresol mixture available under the trade name Cresol DAB 4, 250 parts of water and 200 parts of cyclohexane are intensely mixed. To this mixture, 282 parts of technical-grade carbylsulfate and 688 parts of 25% aqueous sodium hydroxide solution are added as described in Example 5. By working up analogously to the procedure described in Example 5, 122 parts (61.6% of the theory) of vinyl sulfonic acid cresyl ester, B.P. 143 to 148° C./7 mm. Hg, refractive index $n_D^{20} = 1.5220$, is obtained.

Example 7

282 parts of technical-grade, about 80% carbylsulfate and 640 parts of 25% aqueous sodium hydroxide solution are added to a mixture of 128.5 parts of 2-chlorophenol, 250 parts of water and 200 parts of methylene chloride as described in Example 5. By working up analogously to the procedure described in Example 5, 177 parts (81% of the theory) of vinylsulfonic acid 2-chlorophenyl ester is obtained as a colorless oil, B.P. 122 to 124° C./0.2 mm. Hg, refractive index $n_D^{20} = 1.5405$.

Example 8

282 parts of technical grade, about 80% carbylsulfate and 662 parts of 25% aqueous sodium hydroxide solution are added, as described in Example 5, to an intensely stirred mixture of 122 parts of salicylic aldehyde, 200 parts of water, 200 parts of ethylene chloride and 50 parts of acetone. Working up is as described in Example 5, but only the solvent is removed under reduced pressure. The residue consists of 138 parts (65% of the theory) of vinylsulfonic acid ester of salicylaldehyde in the form of a yellow oil ($n_D^{20} = 1.5472$; hydrogenation iodine number: found 124, calculated 120).

Example 9

282 parts of technical-grade, about 80% carbylsulfate and 667 parts of 25% aqueous sodium hydroxide solution are added, as described in Example 5, to an intensely stirred mixture of 214 parts of salicylic acid phenyl ester, 500 parts of water and 250 parts of ethylene chloride. The product is worked up analogously to the procedure described in Example 5. 175 parts (57% of the theory) of the ester of salicylic acid phenyl ester and vinylsulfonic acid, B.P. 180 to 192° C./0.1 to 0.2 mm. Hg, M.P. 64° C., is obtained.

Example 10

141 parts of carbylsulfate and 323 parts of 25% aqueous sodium hydroxide solution are added, as described in Example 5, to an intensely stirred mixture of 166 parts of 2,4,6-tribromophenol, 250 parts of water and 500 parts of ethylene chloride. The product is worked up analogously to the procedure of Example 8, the solvent distilled off under reduced pressure and the crystalline residue dissolved in and reprecipitated from about 150 parts of methanol. 120 parts (57% of the theory) of vinylsulfonic acid ester of 2,4,6-tribromophenol is obtained in the form of colorless crystals melting at 81.5 to 82.5° C.

Example 11

282 parts of carbylsulfate and 625 parts of 25% aqueous sodium hydroxide solution are added, as described in Example 5, to an intensely stirred mixture of 144 parts of techniical-grade β-naphthol flakes, 500 parts of water, 400 parts of ethylene chloride and 250 parts of acetone. After all the reactants have been added, the mixture is acidified to pH 5, the organic layer separated and the solvent driven off by steam distillation. The organic residue crystallizes upon cooling. It is isolated by filtering on a suction filter and washing several times with water. 180 parts (77% of the theory) of colorless crystalline β-naphthyl vinylsulfonic acid ester, M.P. 58 to 61° C., is obtained.

Example 12

282 parts of technical-grade, about 80% carbylsulfate and 656 parts of 25% aqueous sodium hydroxide solution are added, as described in Example 5, to a mixture of 114 parts of 4,4-dihydroxydiphenylpropane, 250 parts of water, 150 parts of acetone and 150 parts of ethylene chloride. The product is worked up analogously to the procedure of Example 8, the solvent being removed in a falling-film evaporator heated at 100° C. 161 parts (79% of the theory) of 4,4'-dihydroxydiphenylpropane divinylsulfonic acid ester is obtained as a colorless highly viscous resin (hydrogenation iodine number: found 111, calculated 125).

What I claim is:

1. A process for the production of esters of vinylsulfonic acid and aromatic hydroxy compounds which comprises mixing in the presence of a substantial amount of water and at a pH between 7.5 and 11.5 carbylsulfate with an aromatic hydroxy compound selected from the group consisting of (a) hydroxy-substituted aromatic hydrocarbons having 1-3 carbocyclic aromatic rings and 1-3 hydroxy groups directly attached to an aromatic ring, (b) hydroxy aromatic compounds consisting of two benzene rings having a hydroxy group directly attached to a benzene ring and linked by a bridge consisting of a bivalent group from the group consisting of —O—, —S—, —SO—, —SO$_2$—, alkylimino wherein the alkyl group has 1-4 carbons, and acylimino wherein the acyl group is the acyl group of a lower fatty acid with 1-4 carbons, and compounds as aforedefined under (a) and (b) with a substituent on the aromatic ring, said substituent selected from the group consisting of alkyl of 1-20 carbons, aldehyde, chloro, bromo, and carbophenoxy.

2. A process as claimed in claim 1 wherein said pH is between 8 and 10.

3. A process as claimed in claim 1 wherein the process is conducted at a temperature between 0° C. and 30° C.

4. A process as claimed in claim 1 wherein the reaction medium also contains 20–80% by weight, with reference to the total reaction medium, of an organic solvent which is inert under the reaction conditions.

5. A process as claimed in claim 1 wherein the amount of water is in the range of 30% to 80% by weight of the total reaction mixture.

6. A process as claimed in claim 5 wherein said process is conducted at a temperature in the range of —10° C. to 100° C.

References Cited in the file of this patent

UNITED STATES PATENTS 2,949,482    Sims et al. _____ Aug. 16, 1960